United States Patent Office 3,115,510
Patented Dec. 24, 1963

3,115,510
PREPARATION OF DI(AROMATIC) GROUP VIB METAL COMPOUNDS
Rex D. Closson, Northville, Mich., assignor to Ethyl Corporation, New York, N.Y., a corporation of Virginia
No Drawing. Filed Nov. 2, 1960, Ser. No. 66,693
14 Claims. (Cl. 260—438)

This invention relates to aromatic metal coordination compounds and more particularly to the preparation of diaromatic group VIB metal compounds.

It is an object of this invention to provide a method for the preparation of aromatic group VIB metal coordination compounds which method utilizes the metal as a starting material. A more specific object is the provision of a process for the preparation of diaromatic chromium compounds in high yield. Other objects will become apparent by the following discussion.

The diaromatic group VIB metal compounds have been prepared by processes which employ a salt of the desired metal as a starting material. It has now been discovered that the aromatic group VIB metal coordination complex compounds are readily prepared by a process which utilizes the metal itself as a starting material. This process comprises reacting a protonated aromatic compound with a group VIB metal to form a diaromatic group VIB metal ionic compound containing a diaromatic group VIB metal cation. This process has the advantage of producing exceptionally high yields of diaromatic group VIB metal compounds.

The metallic starting materials applicable to this invention are the transition metals of group VIB of the periodic table and include chromium, molybdenum and tungsten (the periodic table referred to is that appearing in Handbook of Chemistry and Physics, 37th edition, pages 392–393; The Chemical Rubber Publishing Company, Cleveland, Ohio, 1955).

According to this invention the group VIB transition metal is reacted with a protonated aromatic hydrocarbon. The aromatic compound employed is protonated by treatment with a strong acid and a Friedel-Crafts substance. Thus protonated toluene is toluene saturated with a strong acid such as anhydrous hydrogen chloride in the presence of aluminum chloride. Acids which are applicable to the process of this invention are the strong inorganic and organic acids which are free of strong oxidizing groups. Thus hydrogen chloride, hydrogen bromide, 100 percent sulfuric acid and the strong organic acids such as trichloroacetic acid, trifluoro acetic acid and the like may be employed. The strong inorganic acids and particularly the halogen acids are preferred as high yields of the desired product are obtained by their use.

The Friedel-Crafts substance employed in the preparation of the protonated aromatic is a Lewis acid and is perhaps better defined as a material having strong electrophilic characteristics. It can be any halide of a metal of groups IIA, IIB, IIIA, IVB, VB, VIIB and VIII of the periodic table. The halide of groups IIB, IIIA, IVB and VIII are preferred. The halides of boron and aluminum are particularly preferred. Illustrative examples of preferred metal halides are boron trifluoride, boron trichloride, boron tribromide, aluminum trichloride, aluminum trifluoride, ferric chloride and the like. Other examples of suitable Friedel-Crafts substances of generally lesser activity are zinc, titanium, zirconium, magnesium, vanadium and manganese halides. Generally speaking, about one mole of Friedel-Crafts substance per mole of group VIB metal to be reacted should be employed in the process of this invention.

When the aromatic compound is reacted with the strong acid and Friedel-Crafts substance, there results an ionic material in which the aromatic compound and the hydrogen of the acid form the cation, and the Friedel-Crafts substance and the anion of the acid are complexed to form the anion. For example, when excess toluene is reacted with anhydrous hydrochloric acid and aluminum chloride, the resulting material is a solution of $(CH_3C_6H_5H)^+(AlCl_3Cl)^-$ in toluene. This is a typical protonated aromatic compound used in my process.

When the group VIB metal is reacted with the protonated aromatic Friedel-Crafts complex compound, there results another complex which consists of the diaromatic metal cation and an anion containing the Friedel-Crafts catalyst complexed with the anion of the protonating agent. An example of such a complex is that which results from the toluene, hydrogen chloride, aluminum chloride complex and chromium metal in the preparation of ditoluene chromium cation. This complex has the formula $[(CH_3C_6H_5)_2Cr]^+[AlCl_3Cl]^-$. This intermediate complex is hydrolyzed in any convenient manner, preferably with water to recover the diaromatic metal ion in water soluble form. The water soluble diaromatic metal cation may then be reacted with various ionic compounds and the resulting diaromatic group VIB compound recovered. With many anions, the diaromatic metal cations form compounds analogous to salts having a wide variety of solubilities in water. When it is desired to recover a compound in solid form, advantage may be taken of salts which form relatively insoluble complexes with the diaromatic metal cation. Examples of anions which form relatively insoluble diaromatic group VIB metal salts are iodide, triiodide, perchlorate, picrate, tetraphenylboron, the "Reineckate," anions of the metal carbonyl hydrides and the hydrides of cyclopentadienyl metal carbonyls. The treatment of a diaromatic group VIB metal cation with other anions, yields salts of varying solubility. Thus the anion can be a halide, nitrate, nitrite, sulfate, sulfide or other inorganic ion. Likewise, the anions may be derived from an organic compound, particularly an organic acid such as the formate, acetate, benzoate or long chain aliphatic acid such as stearate, laurate, or oleate.

The aromatic compound employed in the process of this invention can be any aromatic compound but preferably is an aromatic hydrocarbon compound containing an isolated benzene nucleus. That is, it should preferably be an aromatic compound which is free of aliphatic unsaturation on a carbon atom adjacent the benzene ring and which does not contain unsaturation on a carbon atom of a fused ring which is adjacent the benzene nucleus. Aromatic compounds having from 6 to about 16 carbon atoms are generally preferred in the process of this invention. Benzene itself, mesitylene, toluene, biphenyl, tetralin, 3,3',5,5'-tetramethyl biphenyl and the like are examples of applicable aromatic compounds. It is generally preferred that the aromatic compound employed be a hydrocarbon and have alkyl substituents of up to 2 carbon atoms as these groups are less susceptible to rearrangement of the dealkylation in the presence of a Friedel-crafts substance. However, aromatic compounds having higher alkyl substituents may also be employed particularly when the process is conducted at lower temperatures. In some cases, other aromatic compounds which do not have an isolated nucleus may be employed. Typical examples of such compounds are methylstyrene, naphthalene, 1-isopropylnaphthalene and the like.

In conducting the process of this invention the aromatic compound serves as a carrier for the protonated aromatic and metal reactants and thus it is preferable to conduct the reaction in an excess of the aromatic compound. Ordinarily from about a two-fold to a twenty-fold excess is conveniently employed. When the aromatic compound is itself a solid, it is simply necessary to heat the reaction mixture to above the melting point of the particular aromatic compound employed. Alternatively, a non-reactive non-aromatic solvent may be employed. High boiling saturated hydrocarbon compounds are preferred.

The reaction temperature employed in the process of this invention depends somewhat upon the nature of the aromatic compound employed. However, general temperatures in the range of 20–200° C. are preferably employed. A preferred range is from 70° to 150° C. as it has been found that especially high yields of diaromatic metal compounds are prepared within this range. It is often advisable to conduct the reaction at the reflux temperature of the aromatic compound, particularly when the reflux temperature is within the preferred range for conducting the process.

Reaction times of from a few minutes to about 30 hours may be employed in preparing the diaromatic metal compounds according to the process of this invention; however, from about one half hour to 15 hours constitutes a preferred reaction time range. Usually, however, reaction times of from 1 to 4 hours are sufficient to produce a good yield of product.

The product of the process of this invention is a diaromatic-group VIB transition metal cation compound which may be reduced to the neutral diaromatic metal compound. To effect the reduction step, a particularly efficacious reducing agent is nickel-aluminum alloy containing from 25 to about 75 percent of nickel with the remainder being essentially aluminum. This reducing agent works especially well when in the presence of an aqueous solution of an alkali metal hydroxide, such as sodium hydroxide. This reducing system can be applied with excellent results to the reduction of univalent cation types of penetration complexes in which two uncharged aromatic nuclei are pi-bonded with a chromium atom irrespective of the method by which these complexes have been prepared. When carrying out this reduction process, an aromatic group VIB metal salt—dibenzene chromium iodide, di-biphenyl molybdenum chloride, ditoluene tungsten acetate, dixylene chromium bromide, etc.—is dissolved in an aqueous alkali metal hydroxide solution. Five to ten percent aqueous solutions of sodium hydroxide, potassium hydroxide, cesium hydroxide, rubidium hydroxide or lithium hydroxide are suitable for this purpose. The univalent aromatic metal cation is then contacted at a temperature between about 20 and about 100° C. with the nickel-aluminum alloy which is preferably in a subdivided state. This is readily accomplished by adding the alloy to the above aqueous solution while keeping the temperature in the range above specified. The univalent aromatic metal cation is thereby smoothly and efficiently reduced to the neutral state. Simple extraction and evaporation procedures lead to the separation and recovery of the neutral complex in high yield and purity.

The process of this invention is more fully illustrated by the following specific examples.

*Example I*

In a reaction vessel equipped with heating means, means for agitation and reflux condenser was placed 9540 parts of toluene and 399 parts of aluminum trichloride. The mixture was then saturated with hydrogen chloride gas and 156 parts of powdered chromium metal were then added. The mixture was then refluxed for about 15 hours, after which time the reaction vessel was cooled and the contents hydrolyzed with 250 parts of water. The resulting mixture was then filtered and an excess of potassium iodide was added to the filtrate. Three hundred fifteen parts of ditoluene chromium iodide separated from the solution. This represents a 29 percent yield based on the amount of chromium metal employed. The compound was identified as ditoluene chromium iodide by elemental analysis which showed it to contain 14.6 percent chromium, 46.4 percent carbon, 4.1 percent hydrogen and 35.1 percent iodine. The calculated composition of ditoluene chromium iodide is 14.3 percent chromium, 46.3 percent carbon, 4.4 percent hydrogen and 35.0 percent iodine.

A portion of the ditoluene chromium iodide was reduced to ditoluene chromium by the following procedure: Fifteen parts of potassium hydroxide, 100 parts water and 8 parts of ditoluene chromium iodide were added to a mixture of about 90 parts of benzene and an excess of nickel-aluminum alloy. The mixture was filtered and the benzene layer was evaporated and sublimed to yield the neutral ditoluene chromium.

*Example II*

In a reaction vessel similar to that described in Example I is placed 1 mole of aluminum tribromide and 20 moles of benzene. The benzene is saturated with anhydrous hydrogen bromide and 1.1 moles of molybdenum metal powder are then added. The mixture is then heated at reflux for one half hour after which time it is cooled and hydrolyzed with excess water. A non-reacted molybdenum metal is removed by filtration and the filtrate is treated with excess tetraphenyl boron ion to separate a good yield of dibenzene molybdenum tetraphenyl boron. Potassium iodide or triiodide may also be used to separate the dibenzene molybdenum cation which may then be reduced as shown for chromium in Example I to the neutral dibenzene molybdenum. Equally good results are obtained when the reaction of molybdenum metal and the aromatic compound is conducted at below the reflux temperature of benzene; temperatures as low as 20° C. may be employed.

*Example III*

Following the procedure of Example II, protonated mesitylene is reacted wtih tungsten metal. Anhydrous hydrogen fluoride is used as a protonating agent in conjunction with boron trifluoride which is bubbled through the reaction mixture. The reaction with tungsten is conducted at the reflux temperature of mesitylene and proceeds for about four hours. A good yield of dimesitylene tungsten cation is recovered as described above.

*Example IV*

3,3',5,5'-tetramethyl biphenyl (1000 parts) and aluminum chloride (30 parts) are charged to a reaction vessel having means for agitation and means for charging and discharging liquid, solid and gaseous re-agents. The mixture is then saturated with dry hydrogen chloride and 17 parts of chromium metal powder are added. The vessel is then sealed and heated to 200° C. for three hours. Upon cooling and hydrolysis, a good yield of bis-3,3',5,5'-tetramethyl biphenyl chromium is separated as the Reineckate by the addition of excess Reinecke's salt.

*Example V*

The procedure of Example I is followed using 1,3,5-triethyl benzene as the aromatic reactant, chromium as the metal, hydrogen fluoride as the protonating agent and iron trichloride as the Friedel-Crafts substance. After reduction with nickel-aluminum alloy, a good yield of bis-1,3,5-triethyl benzene chromium is recovered.

*Example VI*

A mixture of 2000 parts of m-xylene and 40 parts of aluminum tribromide are added to a vessel equipped with stirring means which is maintained at 20° C. Hydrogen bromide is then bubbled through the mixture until the m-xylene is saturated. Tungsten powder (40 parts) is then added and the mixture is agitated for 30 hours after which time a good yield of bis m-xylene tungsten cation may be recovered by hydrolysis followed by precipitation with potassium iodide.

*Example VII*

The procedure of Example I is followed using 240 parts of molybdenum in lieu of chromium metal to produce a good yield of ditoluene molybdenum after reduction of the ditoluene molybdenum cation.

The diaromatic group VIB transition metal compounds prepared by the process of this invention are particularly useful in the chemical and allied arts. The univalent cation diaromatic group VIB cationic complexes are very useful as chemical intermediates leading to the formation of the neutral aromatic penetration complexes. Thus, the cation type of compound is readily reduced by means of the nickel-aluminum alloy system referred to above to form the neutral compounds.

The neutral compounds are especially useful in vapor phase chromium plating operations as applied to steel and related ferrous metals. In carrying out these vapor phase techniques, the object to be chromium plated is heated to a temperature above about 300° C. while maintained under an inert atmosphere, such as hydrogen. A neutral aromatic penetration complex of chromium is introduced into the plating zone. As the complex impinges upon the hot metallic surfaces, it is thermally decomposed and thereby lays down a film of chromium on the heated object. A particular advantage of using these neutral complexes in this manner is that the chromium plate is free of oxides of chromium and thus leads to the formation of a highly desirable chromium plate. This procedure is readily adapted to the vapor phase chromium plating of gears, ball bearings, crankshafts, and the like.

The neutral penetration complexes are also especially useful in powdered metallurgy—i.e., in the formation of highly pure powdered chromium which is free of contamination by other metals. This is readily accomplished by forming the neutral aromatic penetration complexes of chromium which are then hydrogenated at elevated temperatures to liberate the aromatic hydrocarbon and powdered chromium in highly pure form. This procedure not only results in the formation of pure chromium by up-grading crude chromium salts, but efficiently and effectively causes separation of chromium from metals with which is is normally admixed.

The chromium complexes prepared according to this invention are useful as additives to motor fuels. For example, the neutral complexes and the fuel-soluble cationic complexes act as surface ignition control additives when dissolved in gasoline. Thus, when such compounds as dibenzene chromium, dibenzene chromium chloride, dibiphenyl chromium acetate, etc. are dissolved in clear—unleaded—gasoline, the resulting fuel composition when used in a spark ignition engine reduced the surface ignition rate caused by previously accumulated engine deposits. For this purpose, the aromatic penetration complexes of chromium should be blended with the fuel in amount such that there is from about 0.001 to about 0.5 percent by weight of chromium based on the weight of the gasoline. These aromatic penetration complexes of chromium also effectively control surface ignition when dissolved in the same concentration range in leaded gasoline, i.e., gasoline containing from about 0.02 to about 6.34 grams of lead per gallon as a lead alkyl antiknock agent. In this utility, the control of surface ignition is the result of the cooperation during engine combustion between the lead alkyl antiknock agent, the chromium complex, and the products of combustion thereof. An advantage of this utility is that the surface ignition rate is continuously suppressed by virtue of the conjoint presence in the gasoline of the alkyl lead antiknock agent and the aromatic penetration complex of chromium.

This application is a continuation-in-part of S.N. 754,514, filed August 12, 1958, and now abandoned.

I claim:

1. The process for forming a diaromatic group VIB metal ionic compound containing a diaromatic group VIB metal cation, said cation having two aromatic molecules having an isolated benzene nucleus and from 6 to about 16 carbon atoms, which comprises reacting a protonated aromatic hydrocarbon compound having an isolated benzene nucleus and from 6 to about 16 carbon atoms, with a group VIB metal.

2. The process for preparing a diaromatic group VIB metal ionic compound containing a diaromatic group VIB metal cation, said cation having two aromatic molecules having from 6 to about 16 carbon atoms and an isolated benzene nucleus, which comprises protonating an aromatic hydrocarbon compound having 6 to about 16 carbon atoms and an isolated benzene nucleus by reacting said aromatic compound with a strong acid, free of strong oxidizing groups, and a Friedel-Crafts substance selected from the class consisting of groups IIA, IIB, IIIA, IVB, VB, VIIB, and VIII metal halides and subsequently reacting said protonated aromatic compound with a group VIB metal.

3. The process of claim 2 wherein an excess of said aromatic hydrocarbon compound over that required to react with said group VIB metal is employed.

4. The process of claim 3 wherein a 2 to 20-fold excess of said aromatic hydrocarbon compound is employed.

5. The process of claim 3 wherein said metal is chromium.

6. The process of claim 3 where said strong acid is a hydrogen halide.

7. The process of claim 3 wherein said aromatic hydrocarbon compound contains substituents selected from the group consisting of alkyl radicals containing up to 2 carbon atoms.

8. The process of claim 3 wherein the temperature employed ranges from 20 to 200° C.

9. The process of claim 3 wherein the temperature employed ranges from 70 to 150° C.

10. The process of claim 5 where said aromatic compound is toluene.

11. The process of claim 6 where said Friedel-Crafts substance is a group IIIA metal halide.

12. The process of claim 6 wherein said hydrogen halide is hydrogen chloride.

13. The process of claim 11 where said group IIIA metal halide is $AlCl_3$.

14. The process for preparing ditoluene chromium ionic compounds which comprises protonating toluene with aluminum chloride and hydrogen chloride and subsequently reacting said protonated toluene in the presence of excess toluene with chromium.

References Cited in the file of this patent

UNITED STATES PATENTS 2,892,857     Ecke et al. _____ June 30, 1959

FOREIGN PATENTS 1,054,456     Germany _____ Apr. 9, 1959